(12) United States Patent
Xu et al.

(10) Patent No.: US 11,060,542 B2
(45) Date of Patent: Jul. 13, 2021

(54) CONNECTING MEMBER, RECEIVING MEMBER, HOUSING AND DISPLAY DEVICE

(71) Applicants: BOE TECHNOLOGY GROUP CO., LTD., Beijing (CN); K-TRONICS (SUZHOU) TECHNOLOGY CO., LTD., Jiangsu (CN)

(72) Inventors: Jielong Xu, Beijing (CN); Tao Ni, Beijing (CN)

(73) Assignees: BOE TECHNOLOGY GROUP CO., LTD., Beijing (CN); K-TRONICS (SUZHOU) TECHNOLOGY CO., LTD., Jiangsu (CN)

( * ) Notice: Subject to any disclaimer, the term of this patent is extended or adjusted under 35 U.S.C. 154(b) by 257 days.

(21) Appl. No.: 16/113,112

(22) Filed: Aug. 27, 2018

(65) Prior Publication Data

US 2019/0293097 A1 Sep. 26, 2019

(30) Foreign Application Priority Data

Mar. 26, 2018 (CN) .......................... 201810256729.3

(51) Int. Cl.
*F16B 37/04* (2006.01)
*F16B 2/22* (2006.01)
*G02F 1/1333* (2006.01)

(52) U.S. Cl.
CPC .......... *F16B 2/22* (2013.01); *G02F 1/133308* (2013.01); *G02F 1/133314* (2021.01)

(58) Field of Classification Search
CPC ....................... F16B 2/22; G02F 2001/133314

USPC .......................................................... 411/182
See application file for complete search history.

(56) References Cited

U.S. PATENT DOCUMENTS

| 2,055,443 | A | * | 9/1936 | Jones | F16B 37/122 |
| | | | | | 411/179 |
| 2,649,884 | A | * | 8/1953 | Westover | F16B 37/043 |
| | | | | | 411/173 |
| 2,936,015 | A | * | 5/1960 | Rapata | F16B 5/0233 |
| | | | | | 411/182 |
| 3,053,357 | A | * | 9/1962 | Stanger | F16B 37/043 |
| | | | | | 403/21 |
| 3,503,584 | A | * | 3/1970 | Erhart | E04B 1/4157 |
| | | | | | 249/205 |
| 4,266,683 | A | * | 5/1981 | Sellinger | H02G 3/088 |
| | | | | | 220/3.2 |

(Continued)

FOREIGN PATENT DOCUMENTS

CN 201084447 Y 7/2008
CN 201621444 U 11/2010

(Continued)

OTHER PUBLICATIONS

First Chinese Office Action dated Jun. 12, 2019, received for corresponding Chinese Application No. 201810256729.3.

*Primary Examiner* — Gary W Estremsky
(74) *Attorney, Agent, or Firm* — Kinney & Lange, P.A.

(57) ABSTRACT

A connecting member, a receiving member, a housing, and a display device are provided. The connecting member includes a columnar body, and a securing member at a first end of the columnar body. The securing member is elastically deformable to detachably connect the connecting member and a receiving member.

5 Claims, 3 Drawing Sheets

(56) References Cited

U.S. PATENT DOCUMENTS

| | | | | |
|---|---|---|---|---|
| 4,760,495 A | * | 7/1988 | Till | F16B 5/0233 |
| | | | | 174/138 D |
| 5,054,953 A | * | 10/1991 | Mattiolo | F16B 5/0233 |
| | | | | 248/603 |
| 5,065,490 A | * | 11/1991 | Wivagg | F16B 19/1081 |
| | | | | 24/297 |
| 5,308,205 A | * | 5/1994 | Lautenschlager | F16B 13/02 |
| | | | | 411/182 |
| 5,616,052 A | * | 4/1997 | Pan | F16B 37/043 |
| | | | | 411/182 |
| 5,645,282 A | * | 7/1997 | Belter | F16J 15/061 |
| | | | | 277/598 |
| 2008/0316690 A1 | * | 12/2008 | Kim | H05K 5/02 |
| | | | | 361/679.27 |

FOREIGN PATENT DOCUMENTS

| | | |
|---|---|---|
| CN | 202302634 U | 7/2012 |
| CN | 206310201 U | 7/2017 |
| DE | 3620094 A1 | 12/1987 |
| EP | 0186857 A1 | 7/1986 |

\* cited by examiner

10

10

US 11,060,542 B2

CONNECTING MEMBER, RECEIVING MEMBER, HOUSING AND DISPLAY DEVICE

CROSS-REFERENCE TO RELATED APPLICATION

This application claims priority to Chinese Patent Application No. 201810256729.3 filed on Mar. 26, 2018 in the State Intellectual Property Office of China, the disclosure of which is hereby incorporated by reference in its entirety.

TECHNICAL FIELD

The present disclosure relates to the field of connection structures, and in particular, to a connecting member, a receiving member, a housing, and a display device.

BACKGROUND

Wall-mounted display devices, such as wall-mounted LCD TVs, generally are provided with wall-hanging structures for hanging the display devices on the wall. However, existing wall-hanging structures may result in high cost of display devices and an uncontrollable risk.

SUMMARY

An embodiment of the present disclosure provides a connecting member comprising: a columnar body; and a securing member at a first end of the columnar body, wherein the securing member is elastically deformable to detachably connect the connecting member and a receiving member.

In some embodiments, the securing member comprises a flange connected to the first end of the columnar body.

In some embodiments, the securing member further comprises a groove at a junction of the flange and the first end of the columnar body.

In some embodiments, an edge of an outer circumference of the flange has a rounded corner.

In some embodiments, the connecting member further comprising: at least one stop block on an outer circumference of the columnar body at a second end of the columnar body opposite to the first end.

In some embodiments, material of the connecting member comprises plastic.

In some embodiments, the columnar body and the securing member are integrally formed as a one-piece structure.

In some embodiments, a threaded hole is disposed in the connecting member, and the threaded hole extends through the securing member and extends from the first end of the columnar body toward a second end of the columnar body opposite to the first end in an axial direction of the columnar body.

In some embodiments, the columnar body is cylindrical, and the securing member is circular in a cross section perpendicular to an axial direction of the columnar body.

In some embodiments, a diameter of the securing member is greater than a diameter of the columnar body.

In some embodiments, the columnar body is in a hollow cylindrical shape, and the securing member is annular in a cross section perpendicular to the axial direction of the columnar body.

In some embodiments, an outer diameter of the securing member is greater than an outer diameter of the columnar body.

An embodiment of the present disclosure provides a receiving member for mounting the connecting member in any of the above embodiments, wherein the receiving member comprises a protruding column, and a mounting hole is disposed in the protruding column and extends through the protruding column in an axial direction of the protruding column for accommodating an inserted connecting member.

In some embodiments, the securing member comprises a flange connected to the first end of the columnar body, and a stepped groove which cooperates with the flange of the securing member is provided at a first end of the mounting hole.

In some embodiments, the securing member further comprises a groove at a junction of the flange and the first end of the columnar body, and a protruding member which cooperates with the groove of the securing member is disposed in the mounting hole.

In some embodiments, wherein an inner diameter of the mounting hole is equal to or slightly smaller than a diameter of the columnar body of the connecting member.

In some embodiments, the connecting member further comprises at least one stop block, and the at least one stop block is disposed on an outer circumference of the columnar body at a second end of the columnar body opposite to the first end of the columnar body, the receiving member is further provided with at least one notch which cooperates with the at least one stop block, and the at least one notch is disposed at a second end of the mounting hole opposite to the first end of the mounting hole.

An embodiment of the present disclosure provides a housing comprising at least one receiving member in any of the above embodiments.

An embodiment of the present disclosure provides a display device comprising: a display member; and the housing in any of the above embodiments.

DETAILED DESCRIPTION OF THE EMBODIMENTS

Figure 1:
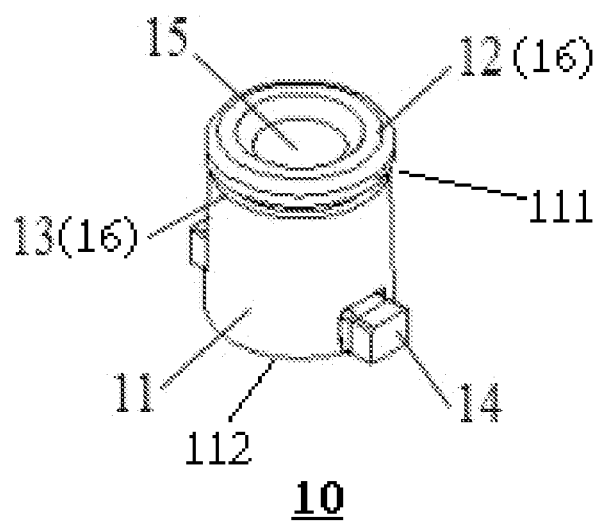
FIG. 1 is a schematic structural view of a connecting member according to an embodiment of the present disclosure.

In the related art, a wall-hanging structure generally includes a wall-hanging bracket, a wall-hanging screw, and a wall-hanging lock. The wall-hanging bracket is mounted on a backboard of a display device, and the wall-hanging screw connects the wall-hanging bracket to the wall-hanging lock which is mounted on a wall, so that the wall-hanging lock is attached to the backboard, thereby mounting the display device on the wall.

Generally, the wall-hanging bracket includes a rivet. When in use, the rivet is mounted on the backboard of the display device, and the wall-hanging screw is connected to the rivet. However, the inventors have found that the rivet has the following disadvantages:

1. The rivet is made of a metal material and needs to be directly formed by a mold, however the cost of the mold is high, resulting in high production cost of the rivet.

2. The rivet needs to be assembled into the backboard of the display device using hot melt technology, however the hot melt technology requires special jigs, resulting in high assembly cost of the rivet.

3. A riveting process of the rivet is complicated, so that it not only increases the cost of the display device, but also introduces a risk that a riveting force is not controlled.

4. It is necessary to post-process the rivet, which has been riveted, by adding plastic insulating sheets, thereby further increasing the process cost of the display device.

In order to overcome the above disadvantages of the wall-hanging structure, an embodiment of the present disclosure provides a connecting member including a columnar body and a securing member. The columnar body is insertable into a receiving member of a housing (such as a rear case/backboard) of a wall-mounted device such as a display device, a projection device, etc., and the securing member is disposed at a first end of the columnar body, and the securing member is elastically deformable so that the connecting member is detachably connected to the receiving member of the housing.

A shape of the columnar body may be a cylinder or a polygonal prism. The receiving member of the housing of the display device is provided with a mounting hole and a shape of the mounting hole corresponds to the shape of the columnar body, so that the columnar body is insertable into the interior of the receiving member of the housing. Since the securing member is elastically deformable, the connecting member is detachably connected to the receiving member of the housing of the display device by the securing member, thereby reducing the production cost of the display device.

In an embodiment of the present disclosure, the securing member may be made of plastic so that the securing member is elastically deformable. In another embodiment of the present disclosure, the connecting member as a whole may be made of plastic; in this way, the securing member is elastically deformable, also the columnar body and the securing member are integrally formed to reduce the production cost of the connecting member. Further, when the entire connecting member is made of plastic, since the plastic is less prone to electrical and safety hazards and the like than the metal material in the related art, the safety performance of the connecting member may be improved.

Hereinafter, the structure and working principle of the connecting member and the receiving member of the housing of the display device according to an embodiment of the present disclosure will be further described with reference to the accompanying drawings.

Figure 2:
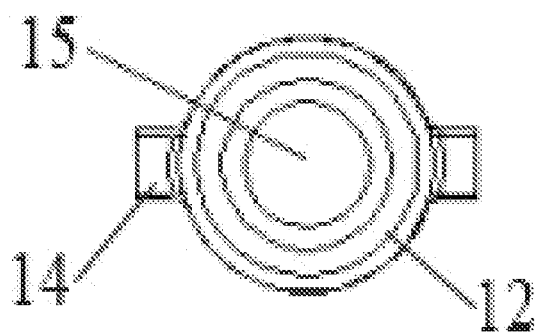
FIG. 2 is a schematic plan view of a connecting member according to an embodiment of the present disclosure.

FIG. 1 is a schematic structural view of a connecting member according to an embodiment of the present disclosure. FIG. 2 is a schematic plan view of a connecting member according to an embodiment of the present disclosure. In the illustrated embodiment of the present disclosure, as shown in FIGS. 1-2, a connecting member 10 includes a columnar body 11 and a securing member 16. The columnar body 11 is in a shape of cylinder and insertable into a cylindrical mounting hole of a receiving member of a housing of a display device. The securing member 16 is disposed at a first end 111 of the columnar body 11 in an axial direction, the first end 111 of the columnar body 11 is an end which is firstly inserted into the mounting hole of the receiving member when the connecting member 10 is mounted to the mounting hole. The securing member 16 is fixedly coupled to the first end 111 of the columnar body 11, and may be coaxial with the columnar body 11. The securing member 16 is elastically deformable so that the connecting member 10 is detachably connected with the receiving member of the housing. Specifically, a diameter of the securing member 16 is larger than a diameter of the mounting hole. When the securing member 16 is inserted into the mounting hole, the securing member 16 may be deformed inward in a radial direction of the securing member 16 by an external force, so that the securing member 16 is compressed in the radially inward direction to enter and pass through the mounting hole. When the columnar body 11 is entirely inserted into the mounting hole and the securing member 16 protrudes from the mounting hole, the securing member 16 may extend outward in the radial direction and return to an initial state, that is, return to a circular structure or an annular structure having a larger diameter than the mounting hole, so as to engage with an opening of the mounting hole. Similarly, when the connecting member is detached from the mounting hole of the receiving member, a radial pressure is applied to a portion of the securing member 16 of the connecting member 10 that protrudes from the mounting hole, so that the securing member 16 is deformed in the radial direction, that is, compressed in the radially inward direction. Then, an axial thrust force toward a second end 112 of the columnar body 11 opposite to the first end 111 is applied to the deformed securing member 16, so that the securing member 16 enters the mounting hole, and exits from the mounting hole along with the columnar body 11. In this way, a detachable connection between the connecting member 10 and the receiving member of the housing of the display device is achieved by the securing member 16.

In an embodiment of the present disclosure, in order to couple the columnar body 11 with a wall-hanging screw, the columnar body 11 is provided with a threaded hole 15 in the axial direction of the columnar body for connecting with the wall-hanging screw, and the threaded hole 15 penetrates the securing member 16. In this case, the securing member 16 is annular. As shown in FIG. 2, in the embodiment of the present disclosure, the threaded hole 15 may be a blind hole to protect internal components of the display device. It should be noted that, since lengths of the wall-hanging screws are different, in some embodiments, the threaded hole 15 may be a through hole in order to match with wall-hanging screws with different lengths, and a corresponding space may be reserved for the wall-hanging screw below the through hole in order to protect the internal components of the display device.

Figure 3:
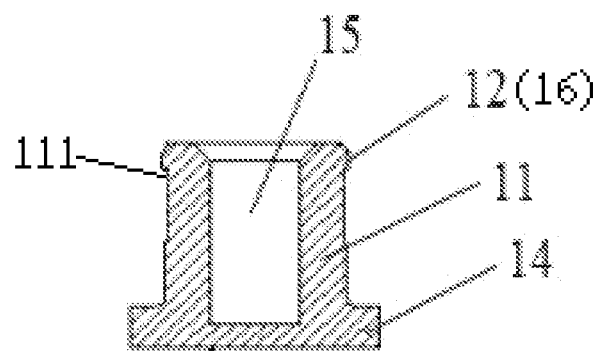
FIG. 3 is a schematic axial cross-sectional view of a connecting member according to an embodiment of the present disclosure.

FIG. 3 is a schematic axial cross-sectional view of a connecting member according to an embodiment of the present disclosure. In the illustrated embodiment of the present disclosure, the securing member 16 may include a flange 12 that is coupled to the first end 111 of the columnar body 11, and an outer diameter of the flange 12 is larger than an outer diameter of the columnar body 11. Specifically, the flange 12 may be an annular structure provided at the first end 111 of the columnar body 11. The flange 12 may be connected to the first end of the columnar body 11 by, for example, a nesting manner. Alternatively, the flange 12 may be formed integrally with the columnar body 11. When the connecting member 10 is inserted into the receiving member of the housing of the display device, the flange 12 may be engaged with the receiving member of the housing to fix the connecting member in the housing of the display device, thereby preventing the connecting member 10 in use from falling off.

Figure 4:
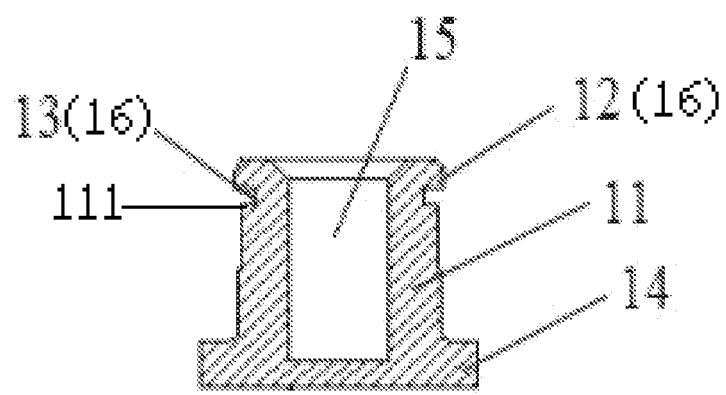
FIG. 4 is a schematic axial cross-sectional view of a connecting member according to another embodiment of the present disclosure.

FIG. 4 is a schematic axial cross-sectional view of a connecting member according to another embodiment of the present disclosure. In this illustrated embodiment of the present disclosure, the securing member 16 may include a flange 12 and a groove 13. The flange 12 is connected to the first end 111 of the columnar body 11, and the annular groove 13 is formed at the junction of the flange 12 and the first end 111 of the columnar body 11 in a circumferential direction. Alternatively, the flange 12, the groove 13 and the columnar body 11 may be integrally formed as a one-piece structure. An outer diameter of the flange 12 may be larger than an outer diameter of the columnar body 11, and an inner diameter of the groove 13 at the bottom of the groove is smaller than the outer diameter of the columnar body 11. When the connecting member 10 is inserted into the receiving member of the housing of the display device, the flange 12 and the groove 13 may be engaged with the receiving member of the housing to fix the connecting member in the housing of the display device, thereby preventing the connecting member 10 in use from falling off.

In an embodiment of the present disclosure, in order to insert the connecting member 10 into the receiving member of the housing smoothly, a radial peripheral edge of an end, away from the columnar body 11, of the flange 12 may be formed as a rounded corner. As shown in FIG. 4, in the schematic cross-sectional view, a portion of the flange 12 is formed in an arc shape. Specifically, the outer diameter of the flange 12 is larger than the outer diameter of the columnar body 11. Since the radially peripheral edge of the end of the flange 12 which first enters the mounting hole is formed as the rounded corner and the flange 12 is elastically deformable, when an diameter of the mounting hole of the receiving member of the housing of the display device is smaller than the outer diameter of the flange 12 or a protruding member which cooperates with the groove 13 is disposed in the mounting hole, the flange 12 may still enter the mounting hole and smoothly move axially along the mounting hole, thereby ensuring that the connecting member smoothly enters the receiving member of the housing of the display device.

In an embodiment of the present disclosure, when the columnar body 11 is a cylindrical structure, the connecting member may rotate in the circumferential direction. In order to avoid rotation of the connecting member relative to the receiving member of the housing, the connecting member 10 may further include a stop block 14 for circumferentially limiting the columnar body 11. The stop block 14 is disposed on the outer circumference of the columnar body 11 at the second end 112 (i.e. an end opposite to the first end) in the axial direction. After the second end 112 of the columnar body 11 is completely inserted into the housing of the display device, the stop block 14 may cooperate with an corresponding structure in the mounting hole of the receiving member of the housing to prevent the connecting member 10 from rotating or loosening. As shown in FIGS. 1-4, two stop blocks 14 may be provided and symmetrically disposed about an axis of the columnar body 11. Further, the number of the stop blocks 14 may be one or more than two, and they are disposed on the outer circumference of the columnar body 11 at the second end 112. It should be noted that when the number of the stop blocks 14 is two or more, the stop blocks 14 do not need to be evenly distributed on the outer circumference of the columnar body 11 at the second end 112 and may be arbitrarily distributed on the outer circumference of the columnar body 11 at the second end as long as they are provided on the outer circumference of the columnar body 11 at the second end and may function to limit the circumferential rotation of the connecting member 10.

Figure 5:
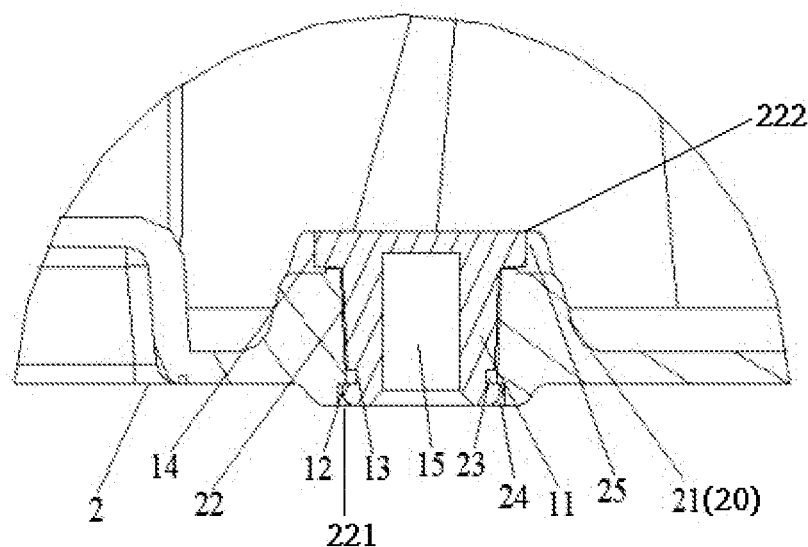
FIG. 5 is a schematic axial cross-sectional structural view showing that a receiving member of a housing of a display device and a connecting member according to an embodiment of the present disclosure are in a connected state.
Figure 6:
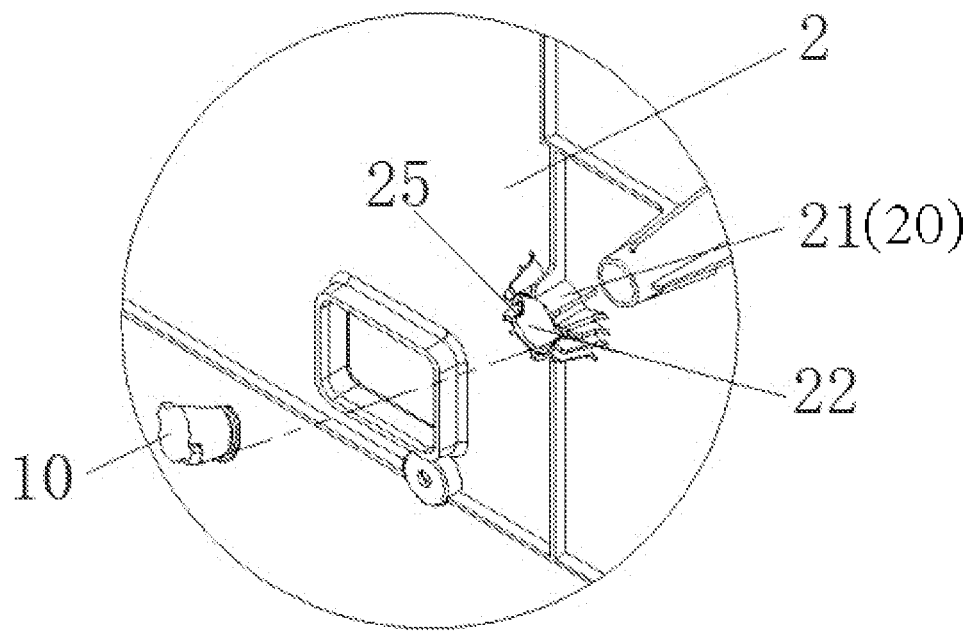
FIG. 6 is a schematic structural view showing that a receiving member of a housing of a display device and a connecting member according to an embodiment of the present disclosure are in a separated state.

FIG. 5 is a schematic axial cross-sectional structural view showing a receiving member of a housing of a display device and a connecting member according to an embodiment of the present disclosure in a connected state, and FIG. 6 is a schematic structural view showing a receiving member of a housing of a display device and a connecting member according to an embodiment of the present disclosure in a separated state. As shown in FIG. 5, the present disclosure further provides a display device including a housing 2, such as a backboard, and the housing 2 is provided with at least one receiving member 20 for mounting the connecting member 10 in the above embodiment. The connecting member 10 is detachably mounted in the receiving member 20.

In an embodiment of the present disclosure, the receiving member may include a protruding column 21. The protruding column 21 may be disposed at any position on the housing 2. Alternatively, as shown in FIGS. 5-6, the protruding column 21 may be disposed on reinforcing ribs of the housing 2. A mounting hole 22 is formed in the protruding column 21 and extends through the protruding column 21 in an axial direction thereof, and the connecting member 10 may be inserted into the mounting hole 22, and the connecting member 10 is detachably mounted to the mounting hole 22 of the protruding column 21 by the securing member 16 thereof.

Specifically, as shown in FIGS. 1-4, the connecting member 10 includes the columnar body 11 and the securing member 16. The columnar body 11 may be a cylindrical structure or a prismatic structure, and the columnar body 11 may be inserted into the mounting hole 22 having a corresponding cylindrical shape or a prismatic shape. The securing member 16 is disposed at the first end 111 of the columnar body 11, and the securing member 16 is elastically deformable to detachably connect the connecting member 10 and the mounting hole 22.

As above mentioned, the securing member 16 may include the flange 12 or both the flange 12 and the groove 13. In the embodiment of the present disclosure, taking the securing member 16 including the flange 12 and the groove 13 as an example, the flange 12 is coupled to the first end 111 of the columnar body 11, and the groove 13 is formed at the junction of the flange 12 and the first end 111 of the columnar body 11. In order to enable the securing member 16 to match an first end 221 of the mounting hole 22 better, in the embodiment of the present disclosure, the first end 221, which corresponds to the first end 111 of the columnar body 11, in an axial direction of the mounting hole 22 is provided with a stepped groove 24 matching the flange 12 of the securing member 16 and an annular protruding member 23 matching the groove 13 of the securing member 16. The stepped groove 24 and the protruding member 23 cooperates with the flange 12 and the groove 13 respectively, so that the connecting member 10 and the receiving member 20 may be tightly connected to prevent the connecting member 10 from falling out of the receiving member 20. An inner diameter of the protruding member 23 at its radially inner circumferential surface is smaller than the inner diameter of the mounting hole 22 and the outer diameter of the columnar body 11, and the outer diameter of the flange 12 is larger than the outer diameter of the columnar body 11 and the inner diameter of the protruding member 23, and the inner diameter of the groove 13 is smaller than the outer diameter of the columnar body 11 and is substantially equal to or slightly larger than the inner diameter of the protruding member 23. When the connecting member 10 is inserted into the mounting hole 22 of the protruding column 21, the flange 12 and the groove 13 may cooperate with the stepped groove 24 and the protruding member 23 at the first end 221 of the mounting hole 22 respectively so that the flange 12 is engaged with the stepped groove 24 and the protruding member 23 is engaged with the groove 13. Therefore, the connecting member 10 is fixed in the mounting hole 22 to prevent the connecting member 10 in use from falling off.

In order to make an end surface of the first end 221 of the mounting hole 22 be substantially flush with an end surface of the flange 12, an distance between the protruding member 23 and the end surface of the first end 221 of the mounting hole 22 is substantially equal to the height of the flange 12. Also, the stepped groove 24 is provided on the inner wall of the mounting hole 22 between the protruding member 23 and the end surface of the first end 221 of the mounting hole 22, and the inner diameter of the stepped groove 24 is greater than or equal to the outer diameter of the flange 12 for receiving the flange 12.

In the embodiment of the present disclosure, the inner diameter of the mounting hole 22 is slightly smaller than or equal to the outer diameter of the columnar body 11 of the connecting member 10, so that the columnar body 11 may be closely fitted with the mounting hole 22. When the connecting member 10 is subjected to a large gravity, the columnar body 11 is not bent and damaged due to lack of support, so that the service life of the connecting member 10 may be improved. When the inner diameter of the mounting hole 22 is slightly smaller than the outer diameter of the columnar body 11, the columnar body 11 also needs to be made of an elastic material so as to be smoothly fitted into the mounting hole 22 to form an interference fit.

In an embodiment of the present disclosure, a second end 222, which corresponds to the second end 112 of the columnar body 11, of the mounting hole 22 in the axial direction is provided with a notch 25 matching the stop block 14 of the connecting member 10. The stop block 14 and the notch 25 cooperate with each other to circumferentially limit the connecting member 10. The number and position of the notches 25 may be determined according to the number and position of the stop blocks 14. When the connecting member 10 is inserted into the mounting hole 22, the stop block 14 may be embedded in the notch 25, so that the notch 25 and the stop block 14 may be engaged with each other to prevent the connecting member 10 from rotating relative to the mounting hole 22 during use. Also, the engagement between the stop block 14 and the notch 25 and the engagement between the flange 12 and the stepped groove 24 may firmly position the connecting member in the mounting hole 22, so as to prevent the connecting member from falling out of the mounting hole 22 during use.

In an embodiment, for the connecting member 10 that does not include the groove as shown in FIG. 3, no protruding member is provided in the mounting hole 22 of the corresponding receiving member 20.

In summary, for the connecting member and the display device of the embodiment of the present disclosure, since the securing member of the connecting member is elastically deformable, a quick installation of the connecting member and the wall-mounted display device may be realized by the securing member after the connecting member is inserted into the receiving member of the housing of the display device, thereby reducing the processing cost of the connecting member and the display device and the assembly cost of the connecting member and the display device, and thereby reducing the production cost of the display device. Meanwhile, since the connecting member and the receiving member of the housing of the display device are detachably connected with each other, the connecting member is convenient to replace when damaged, which may reduce the maintenance cost during the consumer's use. In addition, in the embodiment of the present disclosure, a portion or the whole of connecting member is made of plastic, which may greatly reduce the cost of the connecting member. The structure of connecting member may simplify the manufacturing process thereof, and the structure of the receiving member may also save the manufacturing process cost of the housing of the display device. Moreover, since the connecting member made of the plastic material partially or entirely does not have electrical or safety hazard compared to a metal connecting member, the safety of the display device can be improved.

Although the connecting member and the receiving member in the above embodiments are applied to a wall-mounted display device, those skilled in the art may understand that the connecting member and the receiving member in the above embodiments may be applied to other wall-mounted devices, such as a wall-mounted photo frame, a wall-mounted electric fan, etc.

The above is only a schematic description of the present disclosure, and those skilled in the art should understand that various modifications may be made to the present disclosure without departing from the working principle of the present disclosure, which are within the scope of the present disclosure.

What is claimed is:

1. A receiving member mounting a connecting member, wherein the connecting member comprises:
    a columnar body;
    a securing member at a first end of the columnar body; and
    two stop blocks on an outer circumference of the columnar body at a second end of the columnar body opposite to the first end,
    wherein the securing member is elastically deformable to detachably connect the connecting member and the receiving member;
    wherein the two stop blocks are arranged on opposite sides of the columnar body, and extend from the outer periphery of the columnar body away from the columnar body,
    wherein the receiving member comprises a protruding column, and a mounting hole is disposed in the protruding column and extends through the protruding column in an axial direction of the protruding column for accommodating insertion of the connecting member,
    wherein the securing member comprises a flange connected to the first end of the columnar body, and a stepped groove which cooperates with the flange of the securing member is provided at the first end of the mounting hole, and
    wherein the securing member further comprises a groove at a junction of the flange and the first end of the columnar body, and a protruding member which cooperates with the groove of the securing member is disposed in the mounting hole.

2. The receiving member of claim 1, wherein an inner diameter of the mounting hole is equal to or slightly smaller than a diameter of the columnar body of the connecting member.

3. The receiving member of claim 1, wherein the receiving member is further provided with two notches which cooperate with the two stop blocks, respectively, and the two notches are disposed at a second end of the mounting hole opposite to the first end of the mounting hole.

4. A housing comprising at least one receiving member of claim 1.

5. A display device comprising:
a display member; and
the housing of claim 4.

* * * * *